United States Patent [19]

Hatamura

[11] Patent Number: 4,671,118

[45] Date of Patent: Jun. 9, 1987

[54] LOAD SENSOR

[76] Inventor: Yotaro Hatamura, 12-11, Kohinata 2-chome, Bunkyo-ku, Tokyo, Japan

[21] Appl. No.: 759,314

[22] Filed: Jul. 26, 1985

[30] Foreign Application Priority Data

Aug. 4, 1984 [JP] Japan .................................. 58-163473
May 31, 1985 [JP] Japan .................................. 60-116759

[51] Int. Cl.$^4$ ........................... G01L 5/16; G01L 1/22
[52] U.S. Cl. ................................ 73/862.04; 73/862.65
[58] Field of Search ........... 73/862.04, 862.05, 862.06, 73/862.62, 862.65

[56] References Cited

U.S. PATENT DOCUMENTS

| 3,180,139 | 4/1965 | Soderholm | 73/862.65 |
| 3,439,761 | 4/1969 | Laimins | 73/862.65 X |
| 3,554,026 | 1/1971 | Seed | 73/862.65 |
| 4,478,089 | 10/1984 | Aviles et al. | 73/862.04 |

FOREIGN PATENT DOCUMENTS 2552170 5/1977 Fed. Rep. of Germany ... 73/862.65

OTHER PUBLICATIONS

M. Dubois–"Six-Component Strlig-Gage Balances for Large Wind Tunnels", Experimental Mechanics, vol. 21, No. 11, 11/1981, pp. 401–407.

Primary Examiner—Charles A. Ruehl
Attorney, Agent, or Firm—Oblon, Fisher, Spivak, McClelland & Maier

[57] ABSTRACT

A load sensor is formed of a block, at least one parallel plate structure composed of three or more thin-walled plates formed by two or more through-holes extending in the same direction through the block, and detection means provided with the thin-walled plates at prescribed locations thereof. The load sensor can detect greater forces without increasing its external dimensions at the portion in which its parallel plate structure is included, and can also show high rigidity against forces and moments in directions other than the intended direction.

3 Claims, 20 Drawing Figures

LOAD SENSOR

This invention relates to a load sensor for detecting, from a load applied to a body, one or more force and/or moment components in one or more prescribed directions.

Many machines, apparatus and the like are equipped with means for detecting the magnitudes of loads applied to certain specific parts of the machines, apparatus and the like or the magnitudes of loads applied to bodies handled by the machines, apparatus and the like so as to control them most suitably on the basis of the thus-detected values. In various academic experiments, it may also be essential to determine the magnitudes of loads applied to some specific parts. In order to detect the magnitudes of such loads, several load sensors have been proposed. Of these already-proposed load sensors, a load sensor equipped with a parallel plate structure of particularly superb performance will hereinafter be described.

FIGS. 14A and 14B are side views of the above-mentioned conventional axis sensor. In the figures, there are illustrated a support portion 1, a rigid block 2 secured fixedly on the support portion 1, a square through-hole 3 bored through the block 2 at a suitable location thereof, a fixing portion 4 connecting the block 2 fixedly to the support portion 1, and a movable portion 5 to which a load, that is to be detected, is applied. Numerals 6a, 6b indicate thin-walled plates which have been formed by boring the through-hole 3 through the block 2. These two thin-walled plates 6a, 6b are parallel to each other. A parallel plate structure is composed of a portion of the block 2, which portion centrally includes the thin-walled plates 6a, 6b. Designated at numerals 8a, 8b, 8c, 8d are strain gauges provided respectively at end portions of the thin-walled plates 6a, 6b and adapted to output signals corresponding to deformations of the thin-walled plates 6a, 6b.

When a force $F_z$ is applied in the vertical direction (i.e., along the z-axis) to the movable portion 5 in the load sensor equipped with the parallel plate structure 7, the thin-walled plates 6a, 6b are bent substantially in the same pattern as depicted in FIG. 14B and parallel plate structure 7 hence undergoes a deformation. The thin-walled plates 6a, 6b are susceptible to undergo bending deformations by forces applied thereto in the vertical direction. Furthermore, the deformations of the thin-walled plates 6a, 6b are of the same pattern and are so small that they interfere each other to limited extents only. Accordingly, such a deformation as depicted in FIG. 14B occurs easily. On the other hand, the parallel plate structure 7 has very high degrees of rigidity against forces $F_y$ applied to the movable portion 5 in the direction perpendicular to the drawing sheet (i.e., along the y-axis) and forces $F_x$ applied to the movable portion 5 in the horizontal direction (i.e., along the x-axis). The parallel plate structure 7 can thus be hardly deformed by such forces $F_y$ and $F_x$. Therefore, the parallel plate structure 7 is deformed by forces applied along the z-axis but is not deformed by forces applied in any other directions.

Incidentally, when the force $F_z$ is applied as shown in FIG. 14B, the strain gauges 8a, 8d develop tensile strains whereas the strain gauges 8b, 8c undergo compression strains. In some instances, a moment may also be exerted about the y-axis concurrently with the application of the force $F_z$, resulting in simultaneous development of a deformation due to the moment. When a bridge circuit is constructed in such a way that the outputs of the strain gauges 8a, 8d are added together, the outputs of the strain gauges 8b, 8c are also added together and the former subtracted values are subtracted by the latter, small output components of a deformation mode due to the moment about the y-axis are cancelled out and a correct signal proportional to the force $F_z$ can hence be obtained from the bridge circuit.

As has been described above, the parallel plate structure 7 depicted in FIGS. 14A and 14B is deformed only by the force $F_z$ applied along the z-axis. As a result, the parallel plate structure 7 can detect with a high degree of accuracy the force $F_z$ applied along the z-axis. Needless to say, the forces $F_x$ and $F_y$ applied respectively along the x-axis and y-axis can also be detected provided that the direction at which the parallel plate structure 7 is set, is altered.

When the force applied to the movable portion 5 increases and exceeds a certain value in the load sensor equipped with the parallel plate structure 7, the resulting stress of the parallel plate structure 7 exceeds the elastic limit thereof and undergoes a permanent deformation, thereby making the sensor no longer usable. It may be contemplated to enlarge the overall size (inclusive of the thickness t of each of the thin-walled plates 6a, 6b) of the parallel plate structure 7 so that the above-mentioned problem can be overcome. However, limited spacings are usually available for the installation of load sensors. It is thus difficult in many instances to increase the size of the parallel plate structure 7. As the next method conceivable for the above purpose, may be mentioned to increase the thickness t without changing the length of the thin-walled plates 6a, 6b.

The characteristic feature of the detection of a force by the parallel plate structure 7 resides in the fact that tensile and compression stresses are developed respectively on the outer surfaces of a thin-walled plate, the tensile stress becomes maximum at one end of one of the outer surfaces, both tensile and compression stresses drop substantially to zero at the thicknesswise center of the plate, and the compression stress becomes maximum at the corresponding one end of the other outer surface of the plate (note: the magnitude of the compression stress is substantially equal to that of the tensile stress but their signs are opposite). It is thus possible to detect the applied force with good accuracy by taking out the maximum tensile and compression stresses produced respectively on both sides of the thin-walled plate. The above characteristic feature however becomes less noticeable as the thickness t of the thin-walled plates 6a, 6b increases. When the thickness t of the thin-walled plates 6a, 6b exceeds a certain value relative to the length l thereof, for example, the ratio t/l becomes greater than 0.5, the parallel plate structure 7 can no longer take such a deformation mode as depicted in FIG. 12B and the resulting stress is distributed in a complex pattern throughout the thin-walled plates 6a, 6b. As a result, it becomes difficult to find out locations suitable for the detection of forces (i.e., locations suitable for the installation of strain gauges). Even if such locations are found, the accuracy of each detection is lowered so much that no accurate detection of forces will be feasible, leading to total loss of the characteristic property of the parallel plate structure. Consequently, conventional load sensors were accompanied by a shortcoming that they were unable to detect large forces where limitations were imposed on the enlargement of the dimensions (especially, the dimensions along the y-axis and z-axis) of their parallel plate structures of the same type as the above-mentioned parallel plate structure 7.

With the foregoing in view, the present invention has as its object the provision of a load sensor which has solved the above-described conventional problems and can detect larger forces without increasing the dimensions of its parallel plate structure.

In order to attain the above-described object, the present invention is characterized in that three or more flexible beams are provided substantially in parallel, in continuation with a rigid body to which a force is applied, and in a direction perpendicular to the acting direction of the force.

In one aspect of this invention, there is thus provided a load sensor comprising a block, at least one parallel plate structure composed of three or more thin-walled plates formed by two or more through-holes extending in the same direction through the block, and detection means provided with the thin-walled plates at prescribed locations thereof.

As has been described above, in the present invention, a parallel plate structure is formed by connecting three or more flexible beams to a rigid member in such a way that the flexible beams are parallel to each other and lie in a direction perpendicular to the acting direction of each force to be applied to the rigid member. Therefore, the load sensor according to this invention can detect greater forces without increasing its external dimensions at the portion in which its parallel plate structure is included, and can also show high rigidity against forces and moments in directions other than the intended direction.

The above and other objects, features and advantages of this invention will become apparent from the following description, taking in conjunction with the accompanying drawings, in which.

Figure 13:
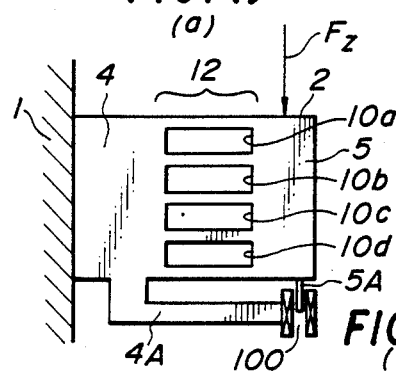
Figure 13:
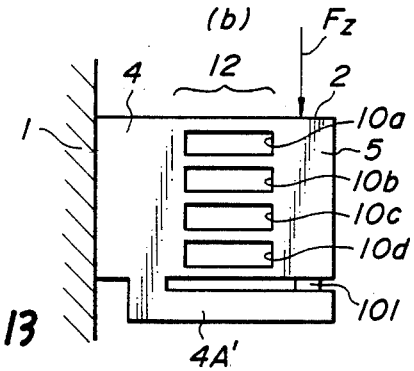
Figure 13:
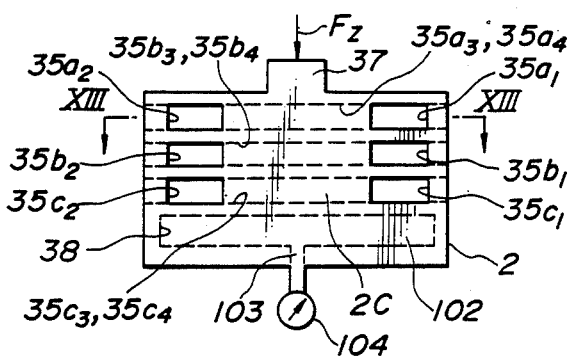
Figure 14A:
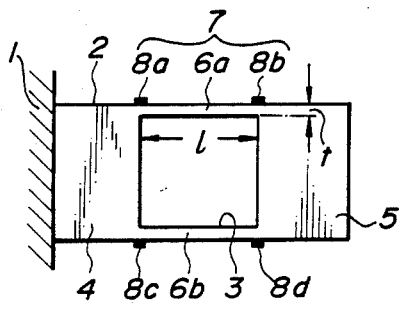
Figure 14B:
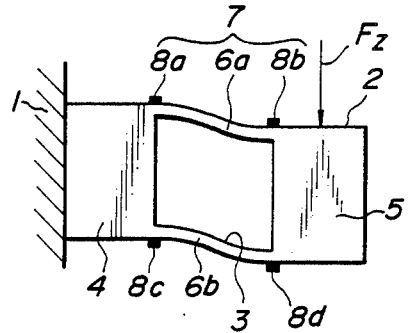

FIGS. 13(a), 13(b) and 13(c) are schematic illustrations of signal converters useful in the load sensors according to the embodiments of this invention; and FIGS. 14A and 14B are side views of a conventional load sensor.

Figure 1A:
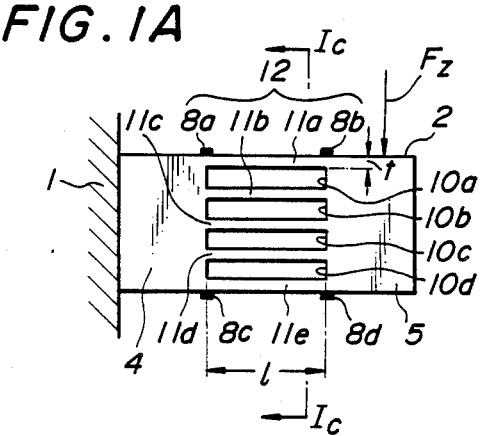
FIGS. 1A and 1B are side views of a load sensor according to the first embodiment of this invention and FIG. 1C is a cross-sectional view of the load sensor.
Figure 1B:
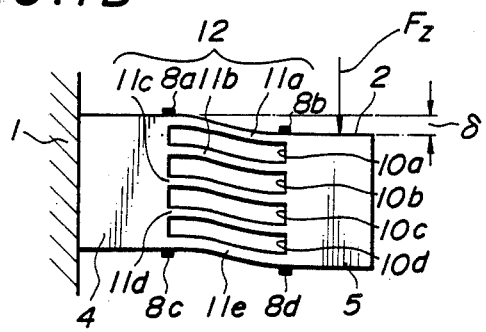
Figure 1C:
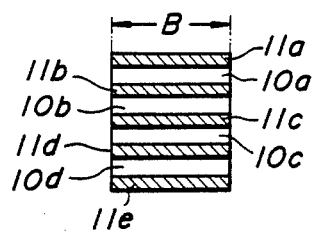

In FIGS. 1A through 1C, the same elements of structure as those illustrated in FIGS. 14A and 14B are identified by the same reference numerals and their description is omitted. Designated at numerals 10a, 10b, 10c, 10d are rectangular through-holes bored along the y-axis (i.e., in the direction perpendicular to the drawing sheet) through the block 2 and arranged in the vertical direction (i.e., along the z-axis). Each of the through-holes 10a–10d has the same length as the length l shown in FIG. 14A and the widths of the through-holes 10a–10d are equal to each other. Furthermore, the through-holes 10a–10d are arranged with an equal interval along a common vertical line. Designated at numerals 11a, 11b, 11c, 11d, 11e are thin-walled plates formed respectively by the individual through-holes 10a–10d. The thickness of each of the thin-walled plates 11a–11e is the same as the plate thickness t depicted in FIG. 14A. The thin-walled plates 11a–11c are in parallel to each other. Numeral 12 indicates a parallel plate structure composed of a portion of the block 2, which portion centrally includes all the thin-walled plates 11a–11e. Similar to the strain gauges 8a–8d shown in FIGS. 14A and 14B, the strain gauges 8a–8d are provided respectively at end portions of the thin-walled plates 11a, 11e. The width of each of the thin-walled plates 11a–11e has a value B as indicated in FIG. 1C which is a cross-sectional view taken along line Ic—Ic in FIG. 1A.

When the force $F_z$ is applied along the z-axis to the movable portion 5, the parallel plate structure 12 develops such a deformation as depicted in FIG. 1B. Since the length and thickness of the thin-walled plates 11a–11e are equal to those of the thin-walled plates 6a, 6b illustrated in FIGS. 14A and 14B, the above-mentioned deformation takes the same mode as the deformation depicted in FIG. 14B. Since the resultant stress is concentrated at the end portions of each of the thin-walled plates 11a–11c, the parallel plate structure 12 never loses its characteristic property as a parallel plate structure. The load $F_z$ is shared by the respective thin-walled plates 11a–11e, the displacement δ by the same force $F_z$ becomes of course smaller than the displacement shown in FIG. 14B. This indicates, on the other hand, that the parallel plate structure 12 is allowed to undergo a deformation under a still greater force $F_z$ while maintaining the characteristic properties of the parallel plate structure. Compared with conventional load sensors, the load sensor of this embodiment can consequently detect greater forces without changing the dimensions of its parallel plate structure. Incidentally, the parallel plate structure 12 undergoes substantially no displacment by forces other than the force $F_z$.

In the above description, the thickness t of the thin-walled plates 11a–11e were assumed to be identical to the thickness t of the conventional thin-walled plates 6a, 6b for the sake of easier comparison. It is however not absolutely necessary to limit the thickness of such thin-walled plates and their number (or the number of such through-holes) to the above-described embodiments. It is apparent that various thicknesses and plate numbers may be chosen for the detection of still greater forces. For each of a few combinations of the thickness and number of such thin-walled plates, the output ε per unit load, the displacement δ per unit load and the total cross-sectional area A of the thin-walled plates will next be determined by calculation. In the following calculations, the double bending deformation of such thin-walled plates (a deformation characteristic to the deformation of such a parallel plate structure, in which the movable portion 5 undergoes a parallel displacement only and the direction of the tip of the movable portion 5 does not change) will be taken into sole consideration and neither the overall first-order bending deformation (a deformation in which the tip of the movable portion 5 hangs down) nor the shear deformation will be dealt with.

The output $\epsilon$ (the strain developed on the outer surface of an end portion of a thin-walled plate) per unit load is expressed by the following equation:

$$\epsilon = \frac{3Fl}{EB} \cdot \frac{1}{nt^2} = K_1 \cdot \frac{1}{nt^2}$$

where
F: force applied to the tip of the movable portion 5;
t: thickness of each thin-walled plate;
B: width of each thin-walled plate;
l: length of each thin-walled plate;
n: number of thin-walled plates; and
E: Young's modulus of material.

The displacement $\delta$ (the displacement due to a deformation of the parallel plate structure) per unit load is represented by the following equation:

$$\delta = \frac{Fl^3}{EB} \cdot \frac{1}{nt^3} = K_2 \cdot \frac{1}{nt^3}$$

On the other hand, the total cross-sectional area A of the thin-walled plates is expressed by the following equation:

$$A = Bnt = K_3 \cdot nt$$

In accordance with the above equations, the outputs $\epsilon$, displacements $\delta$ and cross-sectional areas A for a few combinations of the number n and plate thickness t of thin-walled plates will be tabulated in the following Table.

In the above table, Example I is now taken as a standard. In Example II, the thickness of the thin-walled plates has been rendered still greater (doubled, in this case) so as to detect still greater forces. In this case, the load sensor can withstand still greater forces but cannot prevent stress distributions from spreading. If the plate thickness is increased further and exceeds a certain limit, the characteristic property of the parallel plate structure will be lost. In Examples III and IV, the plate thickness is kept unchanged but the plate number has been increased respectively by two and four times (in other words, the number of through-holes has been increased to 3 and 7 respectively). In this case, their displacements $\delta$ for forces of the same magnitude were reduced respectively to $\frac{1}{2}$ and $\frac{1}{4}$, thereby permitting detection of still greater forces. Furthermore, upon occurrence of a deformation, the resultant stress becomes maximum at the proximal end surface areas of each thin-walled plate. Thus, the characteristic property of the parallel plate structure is not lost. In Examples V and VI, the plate thickness and plate number have both been changed. Each of Examples V and VI can detect still greater forces. In the case of Example V, the characteristic property of the parallel plate structure is still retained although the characteristic property of occurrence of maximum stress in the vicinity of the proximal end of each thin-walled plate has been somewhat lost. Turning to Example VI, maximum stress occurs at the proximal end of each thin-walled plate and the characteristic property of the parallel plate structure has not thus been lost.

As has been described above, this embodiment can detect still greater forces without increasing the dimensions of the parallel plate structure because the parallel plate structure is formed by a plurality of through-holes.

However, the advantageous effects of this embodiment are not limited to the above-described effects but also include some other great effects comparable with the above-described effects. Such additional effects will hereinafter be described in detail.

It has been described above that the parallel plate structure 12 of this embodiment undergoes a deformation only by a force applied in a specific direction, for example, by the force $F_z$ applied along the z-axis but undergoes substantial no displacement by the forces applied in the other directions, i.e., $F_x$, $F_y$. Such a characteristic property is one of principal features of the parallel plate structure, whereby highly-accurate detection is feasible. However, such a characteristic property is not always retained. If an extremely large force is applied in a direction other than the intended direction, the conventional parallel plate structure 7 cannot avoid development of flexure in the former direction. Unlike the conventional parallel plate structure 7, the parallel

| | Plate number (n) | Plate thickness (t) | Output ($\epsilon$) | Displacement ($\delta$) | Cross-sectional area A |
|---|---|---|---|---|---|
| I. Conventional structure | 2 | 1 | $\frac{1}{2} K_1$ | $\frac{1}{2} K_2$ | $2K_3$ |
| II. Plate thickness is only changed. | 2 | 2 | $\frac{1}{8} K_1$ | $\frac{1}{16} K_2$ | $4K_3$ |
| III. Plate number is only changed. | 4 | 1 | $\frac{1}{4} K_1$ | $\frac{1}{4} K_2$ | $4K_3$ |
| IV. Plate number is only changed. | 8 | 1 | $\frac{1}{8} K_1$ | $\frac{1}{8} K_2$ | $8K_3$ |
| V. Plate thickness and number are both changed. | 4 | 1.5 | $\frac{1}{9} K_1$ | $\frac{1}{13.5} K_2$ | $6K_3$ |
| VI. Plate thickness and number are both changed. | 10 | $\frac{1}{2}$ | $\frac{1}{2.5} K_1$ | $\frac{1}{1.25} K_2$ | $5K_3$ | plate structure 12 of this invention can successfully suppress the above-described occurrence of flexure due to the application of a force in a direction other than the intended direction. An application of the parallel plate structure 12 for cutting machining will next be described by way of example.

Figure 2:
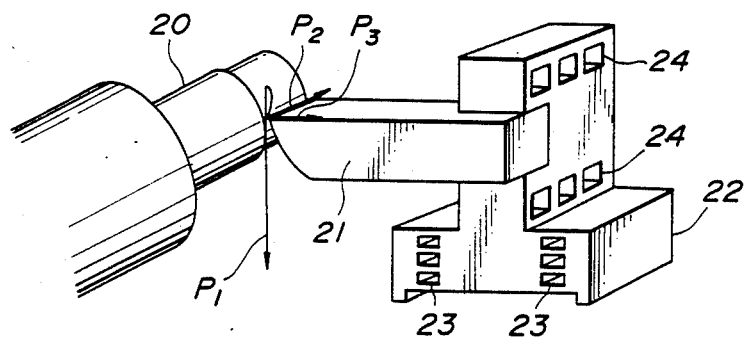
FIG. 2 is a fragmentary perspective view of a cutting machine tool.

Referring next to FIG. 2, there are shown a work 20 as a member to be cut, a cutting tool 21 adapted to cut the work 20, a block 22 on which the cutting tool is fixedly held, load sensors 23 formed through the block 22 for the detection of tangential force components, and load sensors 24 formed through the block 22 for detection of feed force components. Furthermore, $P_1$ indicates a tangential force component applied to the cutting tool 21, $P_2$ is a feed force component applied to the cutting tool 21, and $P_3$ designates a normal force component exerted to the cutting tool 21. The feed force component $P_2$ and normal force component $P_3$ are extremely small compared with the tangential force component $P_1$. In a cutting machine tool, these tangential force component $P_1$, feed force component $P_2$ and normal force component $P_3$ are detected by the load sensors 23, 24 (the load sensor for detecting the normal force component $P_3$ is omitted in the drawing) and a suitable control of the cutting machine tool is carried out on the basis of the thus-detected data. The tangential force component $P_1$ takes an extremely large value when heavy cutting is effected by such a cutting machine tool. There is thus a danger that the load sensor 24 for detecting the feed force component $P_2$ may be applied with an extremely large force in a direction other than the direction in which the feed force component $P_2$ is applied (i.e., the tangential force component $P_1$) and the load sensor 24 may then develop flexure in the former direction.

However, a plurality of through-holes are formed in the parallel plate structure 12 of this embodiment. As apparent from the above table, the total cross-sectional area of its thin-walled plates has thus been increased by several times compared with those of conventional thin-walled plates. This means that the sum of the widths of the thin-walled plates, which widths extend in a direction perpendicular to the intended direction, has been increased by several times compared with the sum of the corresponding widths of conventional thin-walled plates. The rigidity of the parallel plate structure 12 has thus been significantly increased in the above direction so that its flexure in the direction is suppressed. Use of the load sensor of this invention as the load sensor 24 permits successful suppression of flexure by the tangential force component $P_1$ even when heavy cutting is performed. Since the load sensor of this invention is applied as the load sensor 23, the load sensor 23 can detect, without any problems, the large tangential force component $P_1$ exerted upon heavy cutting. If the primary concern is placed on the suppression of the above-mentioned flexure, the number and thickness of thin-walled plates may be adjusted at will so that a desired cross-sectional area can be obtained.

As has been mentioned above, the present embodiment can detect greater forces without increasing the dimensions of the parallel plate structure and at the same time, has greater rigidity levels against forces applied in directions other than the intended direction and can hence suppress flexure in the directions.

Figure 3:
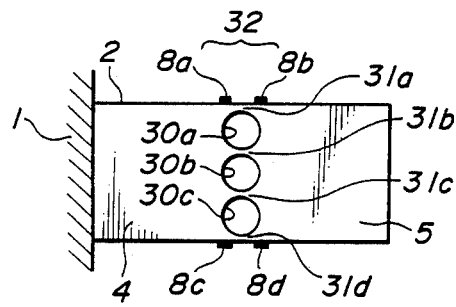
FIG. 3 is a side view of a load sensor according to the second embodiment of this invention.

In FIG. 3, like elements of structure as those shown in FIG. 1 are identified by like reference numerals and their description is thus omitted. In FIG. 3, there are illustrated through-holes 30a, 30b, 30c having a circular cross-section, arranged in the vertical direction (i.e., along the z-axis) and formed along the y-axis (i.e., in the direction perpendicular to the drawing sheet), and thin-walled plates 31a, 31b, 31c, 31d formed respectively by the formation of the through-holes 30a, 30b, 30c. Since these thin-walled plates 31a–31d have respectively been formed by the circular through-holes 30a–30c, they may not actually be called "plates" although they are indeed "thin-walled". Therefore, It is not absolutely appropriate to use the expression "thin-walled plates". Nevertheless, they will be referred to by the term "thin-walled plates" in the following description because they have the same function (flexible function) as the thin-walled plates depicted in FIGS. 1A through 1C and the term "thin-walled plates" appears to be convenient for indicating the function.

The respective through-holes 30a–30c are arranged with an equal interval on the same vertical line. On the other hand, the thin-walled plates 31a–31d are parallel to each other. Here, the term "parallel" means that when the thin-walled plates 31a–31d are idealized as the thin-walled plates shown in FIG. 1A through 1C, the thin-walled plates extend in parallel to each other. Designated at numeral 32 is a parallel plate structure composed of a portion which centrally include all the thin-walled plates 31a–31d. Here, the words "parallel" and "plate" in the term "parallel plate structure" are used with the same significance as those defined above. Similar to the first embodiment, the strain gauges 8a–8d are provided at end portions of the thin-walled plates 31a, 31d. The operation of the load sensor of this embodiment is the same as that of the first embodiment.

Since the parallel plate structure has been formed by the plurality of through-holes in this embodiment, the load sensor of this embodiment exhibits the same effects as the preceding embodiment. Furthermore, owing to the circular cross-sectional shape of the through-holes, the hole-forming machining making use of drills can be applied. Therefore, the machining has been extremely facilitated and the thickness of the thin-walled plates can be adjusted with ease.

Figure 4:
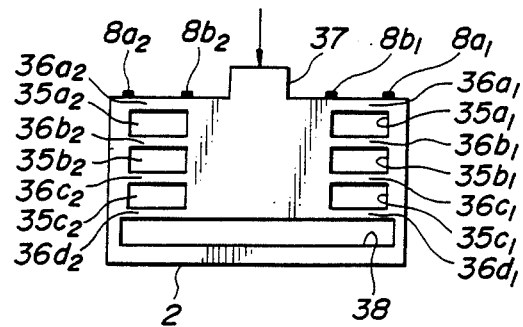
FIG. 4 is a front view of a load sensor according to tne third embodiment of this invention.

The load sensor according to the third embodiment of this invention will next be described with reference to FIG. 4. Designated at numerals $35a_1$–$35c_1$ are square through-holes arranged in the vertical direction along one side wall (i.e., the right side wall) of the block 2 and formed along the y-axis (i.e., in a direction perpendicular to the drawing sheet). The square through-holes $35a_1$–$35c_1$ are arranged on the same vertical line. Numerals $35a_2$–$35c_2$ indicate square through-holes arranged and formed also in the vertical direction along the other side wall of the block 2 (i.e., on the left-hand side of the drawing). Designated at numerals $36a_1$–$36d_1$ and $36a_2$–$36d_2$ are thin-walled plates formed by the formation of the through-holes $35a_1$–$35d_1$ and $35a_2$–$35d_2$ respectively. Designated at numerals $8a_1$–$8b_2$ are strain gauges provided at end portions of the thin-walled plates $36a_1$, $36a_2$. Numeral 37 is a movable portion to which forces are applied, whereas numeral 38 indicates a through-slot formed in a lower part of the block 2. The through-slot 38 has such a horizontal length that it horizontally extends beyond both left and right extremities of the respective through-holes $35a_1$–$35c_2$. When a force is applied in the vertical direction to the movable portion 37, both parallel plate structures are displaced at their inner portions, resulting in deformations of both parallel plate structures.

Since the two parallel plate structures are formed symmetrically by the plurality of through-holes arranged in two rows in this embodiment, the load sensor of the third embodiment can exhibit the same effects as that of the first embodiment.

Figure 5:
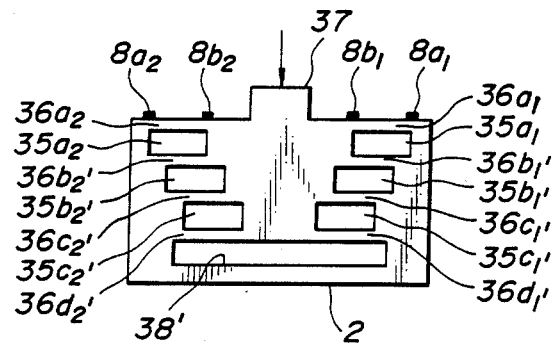
FIG. 5 is a front view of a load sensor according to the fourth embodiment of this invention.

In FIG. 5 showing the load sensor according to the fourth embodiment of this invention. In the figure, like elements of structures as those shown in FIG. 4 are designated by like reference numerals. Their description is thus omitted. Designated at numerals $35b_{1'}, 35b_{2'}, 35c_{1'}, 35c_{2'}$ are respectively through-holes formed through the block 2 along the y-axis (in the direction perpendicular to the drawing sheet) and numeral 38' indicates a through-slot formed through the block with the left and right extremities thereof located outside the left extremity of the through-hole $35c_{2'}$ and the right extremity of the through-hole $35c_{1'}$. This embodiment is different from the embodiment depicted in FIG. 4 in that the through-holes of the latter embodiment are arranged on the same vertical lines while the through-holes of the former embodiment are not arranged on the same vertical lines. Namely, the through-holes $35b_{1'}$, $35b_2$ are arranged respectively at points shifted toward the center from their corresponding upper through-holes $35a_1$, $35a_2$. The through-holes $35c_{1'}$, $35c_{2'}$ are arranged at points shifted further toward the center from their corresponding upper through-holes $35b_{1'}$, $35b_{2'}$. Accordingly, the two sets of through-holes are arranged respectively on oblique lines which extend downwardly toward a lower center. The operation and effects of this embodiment are the same as those of the embodiment illustrated in FIG 4.

The 3-axis load sensor according to the fifth embodiment of this invention will now be described with reference to FIG. 6. In the figure, there are shown an inverted T-shaped block 40, a projecting portion 40a, and a base 40b of the block 40. Designated at numeral $41F_x$ is a parallel plate structure formed by a plurality of through-holes extending through the projecting portion 40a from its front wall to its rear wall, while designated at numeral $41F_y$ is a parallel plate structure formed by a plurality of through-holes extending through the projecting portion 40a from one of its side walls to the other side wall. These parallel plate structures $41F_x$, $41F_y$ are of the same type as the parallel plate structure 12 shown in FIGS. 1A–1C. Reference numeral $41F_z$ indicates a parallel plate structure formed by through-holes extending in two rows through the base 40b from its front wall to its rear wall. The parallel plate structure $41F_z$ is of the same type as the parallel plate structure depicted in FIG. 4. It should be borne in mind that strain gauges are not shown in FIG. 6 (this will also apply to the sixth to eighth embodiments, which will be described herein).

The load sensor of this embodiment is a 3-axis load sensor which can detect the force $F_x$ applied along the x-axis, the force $F_y$ applied along the y-axis and the force $F_z$ applied along the z-axis. Namely, the force $F_x$ can be detected owing to the deformation of the parallel plate structure $41F_x$, the force $F_y$ by the deformation of the parallel plate structure $41F_y$, and the force $F_z$ through the deformation of the parallel plate structure $41F_z$.

In the present embodiment, two parallel plate structures are provided with the projecting portion of the inverted T-shaped block respectively by the plurality of through-holes arranged along the x-axis and the plurality of through-holes arranged along the y-axis, and a further parallel plate structure is provided with the base of the inverted T-shaped block by the plurality of through-holes arranged along the y-axis, as described above. Accordingly, the present embodiment exhibits the same effects as the first embodiment and permits simultaneous detection of forces applied respectively along the x-, y- and z-axes.

The 3-axis load sensor according to the sixth embodiment of this invention will now be described with reference to FIG. 7, in which there are shown a columnar block 45, cuts 46a, 46b formed respectively in both side walls of the block 45 at points substantially half the way down from the upper wall thereof, and upper and lower blocks 47a, 47b divided from each other by the cuts 46a, 46b. Designated at numeral $48F_x$ is a parallel plate structure formed by a plurality of through-holes extending through the upper block 47a from its front wall to its rear wall and having a circular cross-section. Numeral $48F_y$ indicates another parallel plate structure extending through the upper block 47a from one of its side walls to the other side wall and having a circular cross-section. On the other hand, numeral $48F_z$ is a further parallel plate structure formed by a plurality of through-holes extending through the lower block 47b from its front wall to its rear wall and having a circular cross-section. In the parallel plate structure $48F_z$, the two sets of through-holes are arranged on oblique lines extending downwardly toward a lower center in exactly the same manner as in the embodiment shown in FIG. 5. The parallel plate structures $48F_x$, $48F_y$, $48F_z$ detect respectively the forces $F_x$, $F_y$, $F_z$ which are applied along the x-, y- and z-axes respectively. The embodiment depicted in FIG. 6 is different from the present embodiment in the shapes of their blocks, the cross-sectional shapes of their through-holes and the arrangements of their lowermost parallel plate structures. The operation and effects of this embodiment are the same as those of the embodiment shown in FIG. 6.

Figure 6:
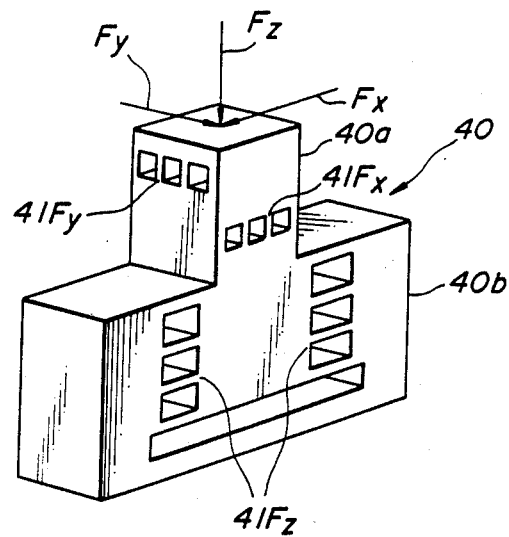
FIG. 6 is a multi-axis load sensor according to the fifth embodiment of this invention.
Figure 7:
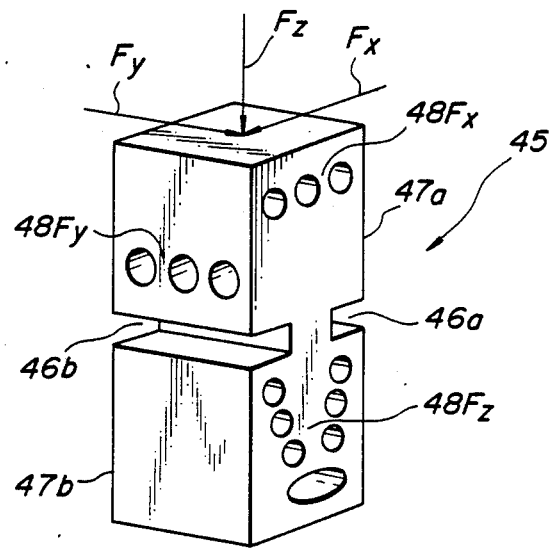
FIG. 7 is a multi-axis load sensor according to the sixth embodiment of this invention.

It can be readily envisaged that in the embodiment shown in FIG. 6 or 7, separation of the projecting portion 40a or upper block 47a results in the provision of a 2-axis load sensor composed of the parallel plate structures $41F_x$, $41F_y$ or the parallel plate structures $48F_x$, $48F_y$.

Figure 8:
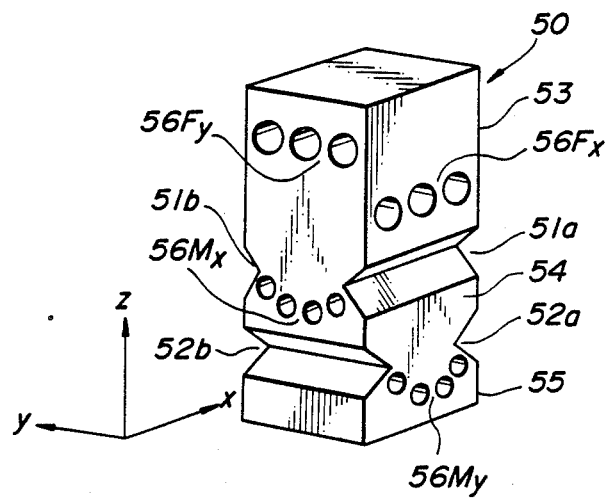
FIG. 8 is a multi-axis load sensor according to the seventh embodiment of this invention.

Referring next to FIG. 8, the 4-axis load sensor according to the seventh embodiment of this invention will be described. In the drawing, there are illustrated a columnar block 50, cuts 51a, 51b formed in the form of wedges respectively in the front and rear walls of the block 50, cuts 52a, 52b formed in the form of wedges respectively in both side walls of the block 50 at points below the cuts 51a, 51b. There are also shown an upper block 53 defined by the cuts 51a, 51b, a middle block 54 defined by the cuts 51a, 51b and 52a, 52b, and a lower block 55 defined by the cuts 52a, 52b. Numeral $56F_x$ indicates a parallel plate structure formed by a plurality of through-holes extending through the upper block 53 from its front wall to its rear wall and having a circular cross-section, while numeral $56F_y$ indicates another parallel plate structure formed by a plurality of through-holes extending through the upper block 53 from one of its side walls to the other side wall and having a circular cross-section. Designated at numeral $56M_x$ is a radial plate structure (which will be described herein) formed by a plurality of through-holes extending through the middle block 54, at heights corresponding to the lower walls of the cuts 51a, 51b and from one of its side walls to the other side wall and having a circular cross-section. On the other hand, numeral 56$M_y$ indicates another radial plate structure formed by a plurality of through-holes extending through the lower block 55, at heights corresponding to the lower walls of the cuts 52a, 52b and from its front wall to its rear wall and having a circular cross-section. Before proceeding with further description of this embodiment, the approximate construction and function of a radial plate structure will next be described with reference to FIG. 9.

Figure 9:
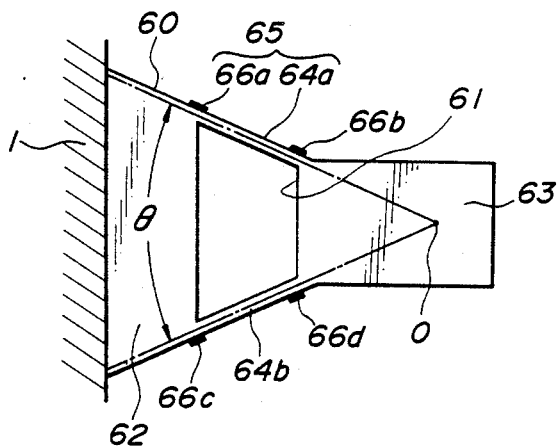
FIG. 9 is a side view of a load sensor equipped with a radial plate structure.

The load sensor equipped with a radial plate structure will next be described with reference to FIG. 9, in which there are illustrated a support portion 1, a rigid block 60 supported by the support portion 1, a trapezoidal through-hole 61 bored through the block 60, a fixed portion 62 connecting the block 60 fixedly to the support portion 1, and a movable portion 63 to which moments are applied. Numerals 64a, 64b indicate thin-walled plates formed as a result of formation of the trapezoidal through-hole 61 through the block 60. These two thin-walled plates 64a, 64b are located respectively on radial lines, which extend out at an angle of $\theta$ radially from a point 0 as a center. A radial plate structure 65 is composed of a portion which centrally includes the thin-walled plates 64a, 64b. Designated at numerals 66a, 66b, 66c, 66d are strain gauges provided respectively at end portions of the thin-walled plates 64a, 64b.

When a moment is applied about an axis, which passes through the point 0 of the movable portion 63 and extends in a direction perpendicular to the drawing sheet, in a load sensor equipped with the radial plate structure 65, the thin-walled plates 64a, 64b are bent and thus deformed. The thin-walled plates 64a, 64b are susceptible of developing deformation by the above-described moment. They however have high rigidity against moments applied about axes in the other directions and all forces applied along any of the axes. They are thus hardly deformed by such moments and forces. The load sensor can thus detect with good accuracy moments, which are applied about the axis passing through the point 0 and extending in the direction perpendicular to the drawing sheet, by means of strain gauges 66a–66d. In a radial plate structure such as the radial plate structure 65, three or more thin-walled plates can be radially extended from the point 0 by forming a plurality of trapezoidal through-holes. By means of such thin-walled plates, still greater moments can be detected and at the same time, the rigidity against forces and other moments can be increased.

Turning back to FIG. 8, the embodiment illustrated therein is described again. The radial plate structures 56$M_x$, 56$M_y$ have been constructed on the basis of the above-described principle. In place of trapezoidal through-holes, a plurality of through-holes having circular cross-sections are arranged in an arcuate pattern. Therefore, the thin-walled plates formed by the above through-holes have the same function as the thin-walled plates 64a, 64b illustrated in FIG. 9. If the x-, y- and z-axes are established as shown in the drawing, the parallel plate structure 56$F_x$ detects the force $F_x$ applied along the x-axis while the parallel plate structure 56$F_y$ detects the force $F_y$ applied along the y-axis. On the other hand, the radial plate structure 56$M_x$ detects the moment $M_x$ applied about the x-axis while the radial plate structure 56$M_y$ detects the moment $M_y$ applied about the y-axis. Therefore, the load sensor of this embodiment functions as a 4-axis load sensor.

In the present embodiment, as described above, the cuts are formed in the columnar block and the thus-divided block portions are provided with the two parallel plate structures formed by the two sets of plural through-holes arranged respectively along the x-axis and y-axis and the two radial plate structures formed by the two sets of plural through-holes arranged respectively in the arcuate pattern in the planes which extend at a right angle to each other. The 4-axis load sensor of this embodiment can detect large forces along the x- and y-axes without need for enlarging the outer dimensions. It is also provided with high rigidity against forces applied in directions other than the intended direction. Furthermore, the 4-axis load sensor can also detect large moments applied about the x- and y-axes.

Figure 10:
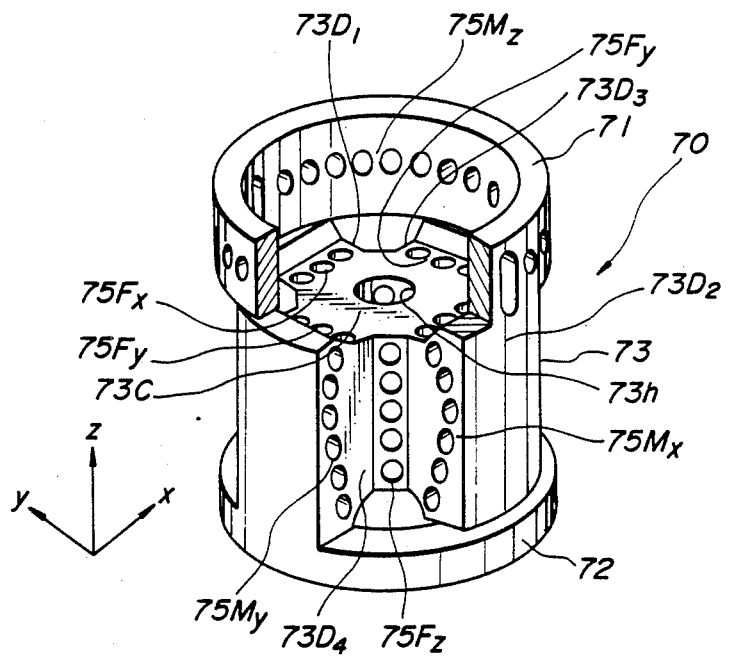
FIG. 10 is a partially cut-away perspective view of a multi-axis load sensor according to the eighth embodiment of this invention.

The 6-axis load sensor according to the eighth embodiment of this invention will now be described with reference to FIG. 10. In the drawing, numeral 70 is a rigid block which is divided into three parts as described next. Namely, numeral 71 indicates an upper ring portion formed into a ring-like shape, numeral 72 a lower ring portion formed also into a ring-like shape, and numeral 73 a middle portion positioned between the upper ring portion 71 and lower ring portion 72. The middle portion 73 is formed substantially into a cruciform. As indicated in the drawing, x-axis and y-axis are conceived along the resultant cross and z-axis is also conceived in a direction perpendicular to the x- and y-axes. Designated at numeral 73h is a central bore formed centrally through the middle portion 73 along the z-axis. Designated at numeral 73C is a central block defining the central bore 73h centrally. Numerals 73$D_1$, 73$D_2$ indicate wing portions extending out symmetrically from the central block 73C along the y-axis. Designated at numeral 73$D_3$, 73$D_4$ are wing portions extending out symmetrically from the central block 73C along the x-axis. The upper ring portion 71 is connected to the upper ends of the wing portions 73$D_1$, 73$D_2$ while the lower ring portions 72 is connected to the lower ends of the wing portions 73$D_3$, 73$D_4$.

In the block 70, parallel plate structures and radial plate structures, all indicated by numerals 75, are formed at prescribed points. Namely, numeral 75$M_z$ indicates a radial plate structure formed by a plurality of circular through-holes arranged along the circumference of the upper ring portion 71. The radial plate structure 75$M_z$ detects moments applied about the z-axis. Designated at numeral 75$F_x$ is a parallel plate structure formed by arranging a plurality of circular through-holes, which extend through the wing portions 73$D_1$, 73$D_2$ from their upper walls to their lower walls, along straight lines in the direction of the x-axis. The parallel plate structure 75$F_x$ serves to detect forces applied along the x-axis. Numeral 75$F_y$ indicates a parallel plate structure formed by arranging a plurality of circular through-holes, which extend through the wing portions 73$D_3$, 73$D_4$ from their upper walls to their lower walls, along straight lines in the direction of the y-axis. The parallel plate structure serves to detect forces applied along the y-axis. Designated at numeral 75$F_z$ is a parallel plate structure formed by arranging a plurality of circular through-holes, which extend respectively from the four outer wall portions of the central block 73C (i.e., portions between the adjacent wing portions) and open in the central bore 73h, along the z-axis. The parallel plate structure 75$F_z$ detects forces applied in the direction of the z-axis. Designated at numeral 75$M_x$ is a radial plate structure formed by arranging a plurality of circular through-holes, which extend respectively through the wing portions $73D_1$, $73D_2$ from one side walls thereof to the other side walls thereof, in an arcuate pattern. The radial plate structure $75M_x$ serves to detect moments applied about the x-axis. Numeral $75M_y$ indicates a radial plate structure formed by a plurality of circular through-holes, which extend through the wing portions $73D_3$, $73D_4$ from one side walls thereof to the other side walls thereof, in an arcuate pattern. The radial plate structure $75M_y$ is adapted to detect moments applied about the y-axis. This embodiment is used as a 6-axis load sensor owing to the provision of these three parallel plate structure $75F_x$, $75F_y$, $75F_z$ and three radial plate structures $75M_x$, $75M_y$, $75M_z$.

Let's now suppose that the lower ring portion 72 is fixedly connected to an unillustrated rigid member and the force $F_y$ is applied along the y-axis to the upper ring portion 71. The force $F_y$ is then transmitted, through the upper ring portion 71, the wing portions $73D_1$, $73D_2$ coupled with the upper ring portion 71, the central block 73C, the wing portions $73D_1$, $73D_2$ and the lower ring portion 72, to the unillustrated rigid member. In the course of transmission of the force $F_y$, no deformation is developed at all in the radial plate structures $75M_x$, $75M_y$, $75M_z$ and the parallel plate structures $F_x$, $F_y$ but the parallel plate structure $75F_y$ undergoes a deformation in proportion to the force $F_y$ so as to detect the force $F_y$. Even when the force $F_y$ is large, the parallel plate structure $75F_y$ can detect it without any problem owing to its construction by the plural through-holes. Furthermore, the other parallel plate structures $75F_x$, $75F_z$ and the radial plate structures $75M_x$, $75M_y$, $75M_z$ show high rigidity and do not undergo deformation owing to their construction by the plural through-holes.

In the present embodiment, as described above, the block is divided into the upper ring portion, lower ring portion and middle portion, the middle portion is provided with the bore, central block and four wing portions extending out from the central block, and the circular through-holes are arranged in plural at the desired points to form the three parallel plate structures and the three radial plate structures. The 6-axis load detector of this embodiment can detect large forces along the x-, y- and z-axes and large moments about the x-, y- and z-axes, namely, 6-axis loads and can also show high rigidity against forces and moments applied in directions other than the intended directions.

Figure 11:
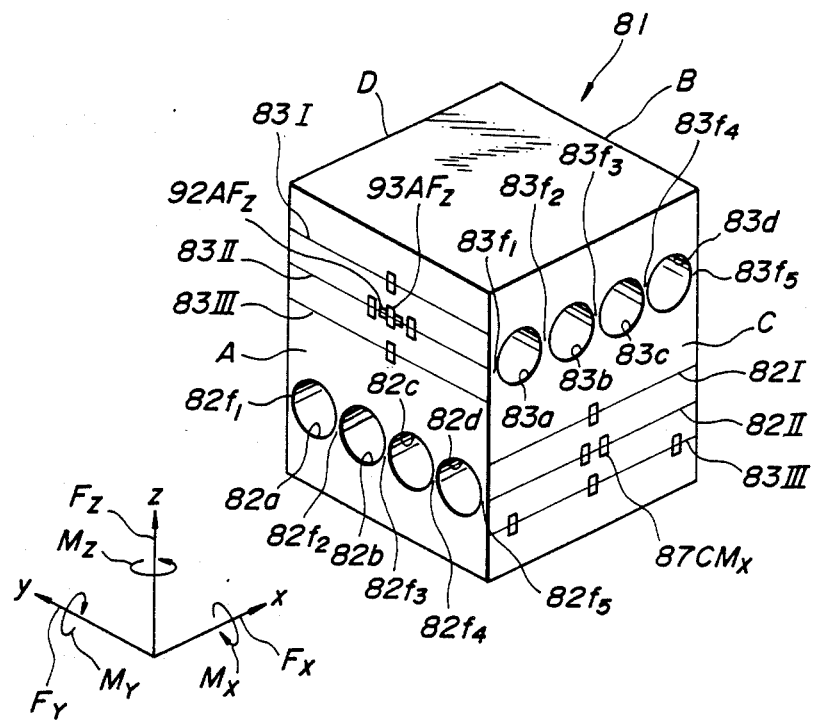
FIG. 11 is a perspective view of a multi-axis load sensor according to the ninth embodiment of this invention.

The 6-axis load sensor according to the ninth embodiment of this invention will now be described with reference to FIG. 11, in which numeral 81 indicates a hexahedral block made of a rigid material and letters A, B, C, D indicate the respective side walls of the block 81. Designated at numerals 82a, 82b, 82c, 82d are circular through-holes extending along the x-axis from the side wall A to the side wall B. These through-holes have the same diameter and are arranged in a row along the y-axis. Owing to the formation of these circular through-holes 82a–82d, there have been formed thin-walled plates $82f_1$–$82f_5$ which have in turn formed the parallel plate structure. Numerals 83a, 83b, 83c, 83d indicate circular through-holes extending along the y-axis from the side wall C to the side wall D. The circular through-holes 83a, 83b, 83c, 83d have the same diameter and are arranged in a row along the x-axis. Designated at numerals $83f_1$, $83f_2$, $83f_3$, $83f_4$, $83f_5$ are thin-walled plates formed by the circular through-holes 83a–83d. The parallel plate structure has been formed by these thin-walled plates $83f_1$–$83f_5$.

A parallel plate structure equipped with such many thin-walled plates has so excellent functions that it is able to detect still greater loads as described in the preceding examples, compared with a parallel plate structure composed of only two thin-walled portions, and has still greater rigidity against loads applied in directions other than the intended direction and suppress fluxure in the former directions.

Designated at numeral 82I, 82II, 82III are imaginary lines drawn along the x-axis on the side wall C, respectively at heights equal to the upper edges, central axes and lower edges of the through-holes 82a–82d. On the other hand, the numerals 83I, 83II, 83III indicate respectively imaginary lines drawn, similar to the imaginary lines drawn on the side wall C, in connection with the through-holes 83a–83d on the side wall A. As shown on the drawing, strain gauges are provided at prescribed points on the respective imaginary lines 83I, 83II, 83III on the side wall A. Strain gauges are also provided on the side wall B, at points symmetrical to the former points. In addition, strain gauges are also provided at prescribed points on the respective imaginary lines 82I, 82II, 82III on the side wall C. Strain gauges are also provided on the side wall D, at points symmetrical to the points on the side wall C. The mutual positional relationship among these strain gauges will next be described clearly with reference to FIG. 12.

Figure 12A:
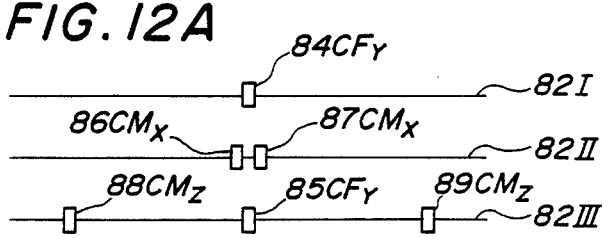
FIGS. 12A and 12B illustrate the arrangements of strain gauges shown in FIG. 11.
Figure 12B:
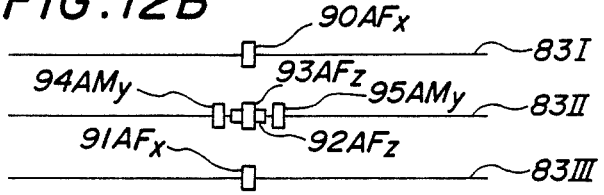

FIGS. 12A and 12B show the arrangement patterns of the strain gauges on the side walls C and A respectively. In each of these figures, numerals 82I, 82II, 82III, 83I, 83II, 83III indicate their corresponding imaginary lines in FIG. 11. Designated at numeral $84CF_y$ is a strain gauge arranged approximately centrally on the imaginary line 82I. Designated at numeral $85CF_y$ is a strain gauge arranged approximately centrally on the imaginary line 82III (at a point right below the strain gauge $84CF_y$ as seen on the drawing). Designated at numerals $86CM_x$, $87CM_x$ are strain gauges arranged symmetrically at points as close as possible to the central line of the side wall C. It is desirable to arrange the strain gauges $86CM_x$, $87CM_x$ as close as possible to the center. If the interval of the imaginary lines 82I, 82II, 82III is so narrow that the strain gauges $86CM_x$, $87CM_x$ cannot be disposed in the proximity of the central part due to the existence of the strain gauges $84CF_y$, $85CF_y$, it is desirable to arrange the strain gauges $86CM_x$, $87CM_x$ as close as possible to the central part while avoiding their overlapping with the strain gauges $84CF_y$, $85CF_y$. Designated at numerals $88CM_z$, $89CM_z$ are strain gauges arranged on the imaginary line 82III at points near both ends of the imaginary line 82III. Numeral $90AF_x$ indicates a strain gauge arranged almost centrally on the imaginary line 83I, while numeral $91AF_x$ indicates a strain gauge arranged almost centrally (at a point right below the strain gauge $90AF_x$ as seen on the drawing) on the imaginary line 83III. Designated at numerals $94AM_y$, $95AM_y$ are strain gauges arranged, symmetrically relative to the central axis of the side wall A, on the imaginary line 83II. Similar to the strain gauges $86CM_x$, $87CM_x$, it is desirable to arrange these strain gauges as close as possible to the center. Designated at numerals $92AF_z$, $93AF_z$ are strain gauges arranged almost centrally on the imaginary line 83II. The strain gauges $92AF_z$ and $93AF_z$ are arranged in such a way that the direction of each strain extend at a right angle with the others. In the drawing, the strain gauges are each shown in a rectangular form. The length of each of the strain gauges is supposed to coincide with the direction of its expansion and contraction.

Here, the significance of the symbols allotted to the respective strain gauges are explained. Taking the strain gauge 84CF$_y$ by way of example, the symbol C indicates that this specific strain gauge is provided on the side wall C and the symbol F$_y$ indicates that this specific strain gauge is adapted to detect the force component F$_y$. The symbols allotted to the other strain gauges have the same significance. Accordingly, on the side wall B for instance, the strain gauge provided at a point symmetrical to the strain gauge 90AF$_x$ must be designated by 90BF$_x$.

In such a load sensor as shown in FIG. 1A, let's call the axis, along which the force F$_z$ is applied to, "a standard axis"; the axis, which is perpendicular to the standard axis and extends in the direction connecting the fixed portion 4 and the movable portion 5 with each other, "a central axis"; and the axis, which is perpendicular to both standard axis and central axis, "a perpendicular axis". According to this nomenclature, in the structure shown in FIG. 11, the standard axis of the first parallel plate structure composed of the through-holes 82a–82d extends along the y-axis, its central axis runs along the z-axis and its perpendicular axis extends along the x-axis, and the standard axis of the second parallel plate structure composed of the through-holes 83a–83d extends along the X-axis, its central axis runs along the Z-axis and its perpendicular axis extends along the Y-axis. Namely, the standard axes of the two parallel plate structures formed in the block 81 extend at a right angle whereas their central axes are coincided.

The operation of this embodiment will next be described. When the force F$_x$ is applied along the x-axis to the block 81, the resultant deformation of the thin-walled plates 83f$_1$–83f$_5$ is of the bending deformation mode because the force F$_x$ is a force applied to the standard axis of the second parallel plate structure. This deformation is thus detected by the strain gauges 90AF$_x$, 90BF$_x$, 91AF$_x$, 91BF$_x$. When the force F$_y$ is applied along the y-axis to the block 81, the resultant deformation of the thin-walled plates 82f$_1$–82f$_5$ is of the bending deformation mode since the force F$_y$ is a force applied along the standard axis of the first parallel plate structure. This deformation is thus detected by the strain gauges 84CF$_y$, 84DF$_y$, 85CF$_y$, 85DF$_y$.

A parallel plate structure is essentially very rigid to any kind of load components except to a force along its standard axis as mentioned before. But if the magnitudes of those load components are greater, a parallel plate structure will show several deformation modes caused by forces or moments along or about certain axes to some extents; i.e., the expansion and contraction deformation mode caused by a moment about its perpendicular axis, the twisting deformation mode caused by a moment about its central axis and the expansion or contraction deformation mode caused by a force along its central axis. In this ninth embodiment of the present invention, these secondary deformation modes are utilized to detect multiple load components with a single parallel plate structure.

When the moment M$_x$ is applied about the x-axis to the block 81, the resulting deformation of the thin-walled plates 82f$_1$–82f$_5$ is of the expansion and contraction deformation mode caused by a moment about the perpendicular axis of the first parallel plate structure. The deformation of the thin-walled plates 82f$_1$–82f$_5$ is detected by the strain gauges 86CM$_x$, 86DM$_x$, 87CM$_x$, 87DM$_x$. When the moment M$_y$ is applied about the y-axis to the block 81, the resultant deformation of the thin-walled plates 83f$_1$–83f$_5$ is of the expansion and contraction deformation mode caused by a moment applied about the perpendicular axis of the second parallel plate structure. This deformation is then detected by the strain gauges 94AM$_y$, 94BM$_y$, 95AM$_y$, 95BM$_y$. The deformations of the thin-walled plates by these forces and moments and the detection of these deformations by the strain gauges are believed to be readily understandable from the preceding description on FIGS. 14A–14B and FIG. 9.

A description will next be made on a situation in which the moment M$_z$ is applied about the central axis to the block 81. In this case, the deformation of each of the thin-walled plates 82f$_1$–82f$_5$ of these parallel plate structures is of the twisting deformation mode. The twisting deformation caused by the moment M$_z$ is then detected by the strain gauges 88CM$_z$, 88DM$_z$, 89CM$_z$, 89DM$_z$ provided, at the same height, in adjacent to both side walls of the block 81.

When the force F$_z$ is applied along the central axis to the block 81, either expansion or contraction deformation takes place in each of the thin-walled plates 82f$_1$–82f$_5$, 83f$_1$–83f$_5$ depending on whether the force F$_z$ is positive or negative. This deformation mode is called "expansion or contraction deformation mode". When a body is pulled in a single direction, the body is generally expanded in the same direction but contracted in a direction perpendicular to the former direction. When compression is applied in a single direction on the other hand, a contraction takes place in the same direction and an expansion takes place in a direction perpendicular to the former direction. In this embodiment, the force F$_z$ is detected based on the expansion or contraction deformation mode along the central axis. Namely, when the tensile force F$_z$ is applied along the central axis to the block 81, the thin-walled plates 82f$_1$–82f$_5$, 83f$_1$–83f$_5$ develop expansion (tensile strain) along the z-axis and at the same time, contractions (compression strains) are developed along the x-axis and y-axis. In the present embodiment, the tensile strain which is developed along the z-axis in the thin-walled plates 83f$_1$–83f$_5$ is detected by the strain gauges 93AF$_z$, 93BF$_z$, the compression deformation in the direction perpendicular to the direction of the tensile strain is detected by strain gauges 92AF$_z$, 92BF$_z$, and the force F$_z$ is then detected by constructing an electric bridge with these four strain gauges. When a compression force is applied along the z-axis to the block 81 on the other hand, the force F$_z$ can also be detected in exactly the same manner although the directions of deformations developed in the respective strain gauges are all opposite to the direction of the former deformations.

Expressing, by "+" and "−", tensile and compression strains to be developed in each strain gauge when the block 81 is fixed at its lower end and loads are applied to the upper end of the block 81 in the respective directions shown in FIG. 11, the above-described detection by the strain gauges may be summarized as follows:

Force F$_x$: 90AF$_x$(−), 90BF$_x$(+), 91AF$_x$(+), 91BF$_x$(−)
Force F$_y$: 84CF$_y$(−), 84DF$_y$(+), 85CF$_y$(+), 85DF$_y$(−)
Force F$_z$: 92AF$_z$(−), 92BF$_z$(−), 93AF$_z$(+), 93BF$_z$(+)
Moment M$_x$: 86CM$_x$(−), 86DM$_x$(+), 87CM$_x$(−), 87DM$_x$(+)
Moment M$_y$: 94AM$_y$(+), 94BM$_y$(−), 95AM$_y$(+), 95BM$_y$(−)

Moment $M_z$: 88$CM_z$(+), 88$DM_z$(−), 89$CM_z$(−), 89$DM_z$(+)

The thus-obtained strains of the strain gauges can be taken out as electrical signals by means of a suitable bridge circuit as mentioned above.

As has been described above, in the present embodiment, the two parallel plate structures which extend at a right angle are provided with the single piece of block, these parallel plate structures are each composed of the many thin-walled plates, and the strain gauges are provided on the block as the prescribed points thereof. This embodiment can exhibit the same effects as each of the preceding embodiments. Moreover, the present embodiment can detect 6 force and moment components with a simple structure. Since this embodiment has inherent high rigidity against forces applied along the central axis, it features that the rated value can be set at a high level along the central axis. Therefore, effective detections can be performed provided that upon application of the 6-axis load sensor of this invention to an object, the direction of the 6-axis load sensor is determined by taking into consideration the magnitudes of forces and moments to be applied to the object.

It will be easily understood that a sensor capable of detecting up to 4 force and moment components can be obtained when a single parallel plate structure is formed instead of the two parallel plate structures in the above-described ninth embodiment of this invention.

FIGS. 13(a) through 13(c) are schematic illustrations of signal converters other than strain gauges, which signal converters are useful in the load sensors according to the respective embodiments of this invention. In FIGS. 13(a) and 13(b), like elements of structure as those shown in FIG. 1A are designated by like reference numerals. In FIG. 13(c), like elements of structure as those depicted in FIG. 4 are identified by like reference numerals.

Referring first of all to FIG. 13(a), there are illustrated a support arm 4A extending out from the fixed portion 4 in the form of an inverted L, a core 5A either fixed to the movable portion 5 or formed integrally with the movable portion 5, and a differential transformer 100 in which the core 5A is inserted centrally. When the force $F_z$ is applied, the parallel plate structure 12 is deformed, the core 5A is thus shifted downward together with the movable portion 5, and a signal which is proportional to the extent of the shift of the core 5A is then output from the differential transformer 10.

Turning next to FIG. 13(b), numeral 4A' indicates a pinch arm extending out from the fixed portion 4 in the form of an inverted L while numeral 101 designates a piezoelectric element to be pinched between the movable portion 5 and the pinch arm 4A'. When the force $F_z$ is applied, the parallel plate structure 12 is deformed, thereby causing the movable portion 5 to move downward. Since the fixed portion 4 and pinch arm 4A' do not move at this point of time, the piezoelectric element 101 is pressed owing to the movement of the movable portion 5 and outputs a signal in proportion to the thus-applied pressure.

Finally, the signal converter shown in FIG. 13(c) is described. Numerals $35a_1$–$35a_2$ indicate, similar to the load sensor depicted in FIG. 4, through-holes formed in a direction perpendicular to the drawing sheet on both sides, namely, along the left and right side walls respectively. In this embodiment, additional through-holes are also formed horizontally as seen on the drawing. Namely, designated at numerals $35a_3$, $35a_4$ are through-holes extending horizontally through the block 2 and located on both sides, namely, along the front and rear walls respectively. The through-holes $35a_3$, $35a_4$ are formed at the same height as the through-holes $35a_1$, $35a_2$ and with the same transverse cross-sectional dimensions as the through-holes $35a_1$, $35a_2$. Let's now cut the block 2 along lines XIII—XIII and observe the resultant cross-section in the direction indicated by the arrows. The cross-section defines two parallel grooves corresponding to the through-holes $35a_1$, $35a_2$ and extending in one direction as well as two parallel grooves corresponding to the through holes $35a_3$, $35a_4$ and extending in another direction perpendicular to the former grooves. The central part makes up a square land surrounded by these four grooves. Numerals $35b_3$, $35b_4$, $35c_3$, $35c_4$ also indicate through-holes formed horizontally through the block 2 in such a way that when seen on each of the left and right side walls of the block 2, the through-holes $35a_3$, $35b_3$, $35c_3$ lie in a row and the through-holes $35a_4$, $35b_4$, $35c_4$ lie in another row. Designated at numeral 2C is a central square part surrounded by the through holes $35c_1$–$35c_4$. In the drawing, there are also shown an oil compartment 102 formed by sealing the through-hole 38, a piping 103 arranged in communication with the oil compartment 102, and an oil pressure gauge 104 connected to the piping 103. The oil compartment 102 is filled with oil. When the force $F_z$ is applied to the movable portion 37, the parallel plate structure is deformed and the central part (the part surrounded by the respective through-holes) of the block 2 is hence shifted downward, whereby the oil in the oil compartment 102 is applied with a force proportional to the deformation. This force is then transmitted as an oil pressure through the piping 103 to the oil pressure gauge 104, where it is indicated by a needle-like indicator and is also output as a signal corresponding to the oil pressure. Since the load sensor in this embodiment can be used with its four side walls fixed, its strength can be enhanced and more precise outputs can hence be obtained. It is apparent that detection means other than that relying upon oil pressures can also be applied when a load sensor is composed of a block having such mutually-perpendicular through-holes.

Preferred embodiments of this invention have been described above with reference to their corresponding accompanying drawings. In the descriptions of the embodiments, the shapes of the through-holes were referred to as square or circular. It should however be borne in mind that the shapes of such through-holes are not necessarily limited to these shapes and a variety of shapes such as ovals, elongated circles, interconnected round holes (each of which is formed by communicating two small circles with a slit), etc. so long as the resultant structures do not loose their functions as parallel plate structures. Use of an elongated circle is particularly advantageous from the viewpoint of fabrication, because the block can be easily machined by an end mill or the like upon formation of through-holes through the block. Where strain outputs are excessively small, the outermost thin-walled plate may be modified to increase its thickness at a central part thereof (namely, by making the outermost through-hole narrower at a central part thereof), whereby large strains may be produced on the outer surface of the outermost thin-walled plate. As already indicated in the above table, the magnitude of a displacement or output may be chosen at a desired level by making a suitable selection as to the thickness or number of plates. The magnitude of a displacement or output may also be chosen at a desired level by changing the shape of through-holes or modifying the thickness of a plate partially. It is thus apparent that the magnitude of a displacement or output can be suitably chosen by making the thicknesses of individual plates different from one another without making individual plates have the same thickness or forming through-holes with different cross-sectional dimensions without forming through-holes with the same cross-sectional dimensions.

Having now fully described the invention, it will be apparent to one of ordinary skill in the art that many changes and modifications can be made thereto without departing from the spirit or scope of the invention as set forth herein.

I claim:

1. A load sensor comprising a block including a projected portion to which forces are to be applied, said block defining two sets of plural through-holes which in turn define a symmetrical parallel plate structure, said two sets of plural through-holes being symmetrical relative to an imaginary plane extending along the central axis of the block and through the projected portion, at least three thin-walled plates being formed by each set of the plural through-holes, and said projected portion defining at least one parallel plate structure which is formed by a plurality of through-holes and three or more thin-walled plates defined by said plurality of through-holes and has a standard axis extending at a right angle relative to he standard axis of the said symmetrical parallel plate structure.

2. The load sensor as claimed in claim 1, wherein each of the thin-walled plates of the parallel plate structure formed in the projected portion is provided with strain gauges adapted for the detection of each bending deformation of the thin-walled plate and at least one of each expansion and contraction deformation and each twisting deformation of the thin-walled plate.

3. A load sensor comprising:
(a) a block having a central axis extending through a point to which forces are applied, said block including a projecting portion projecting out along the central axis of said block, the point to which forces are applied being located on said projecting portion;
(b) at least one parallel plate structure having a standard axis, said at least one parallel plate structure being composed of two or more sets of three or more thin-walled plates formed respectively by a plurality of through-holes arranged on two straight lines symmetrical relative to the central axis of said block;
(c) detector means provided with the thin-walled plates at prescribed locations thereof; and
(d) at least one additional parallel plate structure having a standard axis, said at least one additional parallel plate structure being of the same type as said at least one parallel plate structure, said projecting portion being equipped with said at least one additional parallel plate structure in such a way that the standard axis of said at least one additional parallel plate structure is out of registration with the standard axis of said at least one parallel plate structure.

* * * * *